Feb. 15, 1966 W. N. JENKINS 3,235,416
CONTINUOUS HEAT TREATMENT OF MOVING ELONGATE METAL MATERIAL
Filed July 11, 1963 3 Sheets-Sheet 1

INVENTOR
WALTER N. JENKINS
BY
Holcombe, Wetherill + Brisebois
ATTORNEYS

Feb. 15, 1966    W. N. JENKINS    3,235,416
CONTINUOUS HEAT TREATMENT OF MOVING ELONGATE METAL MATERIAL
Filed July 11, 1963    3 Sheets-Sheet 2

(a)

(b)

(c)

INVENTOR
WALTER N. JENKINS
BY
Holcombe, Wetherill - Brisebois
ATTORNEYS

Feb. 15, 1966  W. N. JENKINS  3,235,416
CONTINUOUS HEAT TREATMENT OF MOVING ELONGATE METAL MATERIAL
Filed July 11, 1963  3 Sheets-Sheet 3

INVENTOR
WALTER N. JENKINS
BY
Holcombe, Wetherill & Brisebois
ATTORNEYS

United States Patent Office 3,235,416
Patented Feb. 15, 1966

3,235,416
CONTINUOUS HEAT TREATMENT OF MOVING ELONGATE METAL MATERIAL
Walter Norman Jenkins, Swansea, Wales, assignor to The British Iron and Steel Research Association
Filed July 11, 1963, Ser. No. 294,342
Claims priority, application Great Britain, July 12, 1962, 26,829/62
10 Claims. (Cl. 148—129)

This invention relates to the continuous heat treatment of moving elongate material, and more particularly, but not exclusively, to the continuous annealing of steel strip.

Proposals have already been made in co-pending applications Serial Nos. 104,342 and 124,604, respectively filed April 20, 1961, and July 17, 1961, and referred to hereinafter for convenience as Mark I and Mark II, and the present invention comprises improved apparatus and methods of operation for such proposals.

According to the present invention in one aspect there is provided a heat treatment process for moving elongate ferrous material which comprises, passing the material through at least one liquid heat transfer medium stage, successively heating the material by induction heating between its initial entry into and final exit from the liquid medium, successively detecting the hardness of the material following its exit from said liquid medium, and controlling the temperature characteristic to which the material is subjected in response to the detected hardness to maintain the hardness of the material substantially uniform.

According to the present invention in another aspect there is provided heat treatment apparatus for moving elongate ferrous material comprising, container means for liquid heat transfer medium, means for passing the material through at least one portion of said container means, induction heating means for successively heating the material between its initial entry into and final exit from the liquid medium in said container means, means for successively detecting the hardness of the material following its exit from the liquid medium in said container means, and means connected for response to the hardness detecting means for controlling the temperature characteristic to which the material is subjected.

In order that the present invention may be clearly understood in its various aspects and forms, the same will now be more fully described, by way of example, with reference to the accompanying drawings, in which.

Figure 3:
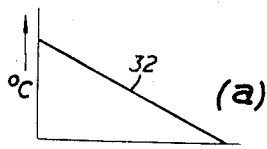
Figure 3:
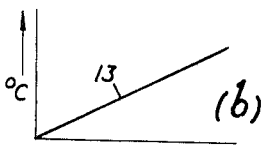
Figure 3:
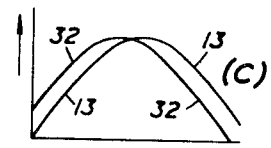
Figure 4:
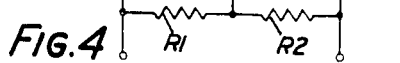
Figure 5:
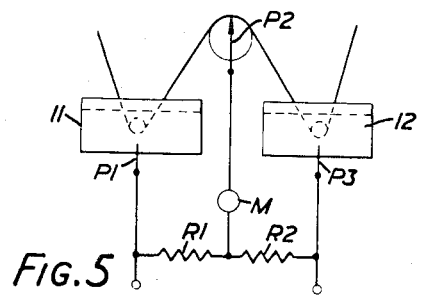
Figure 6:
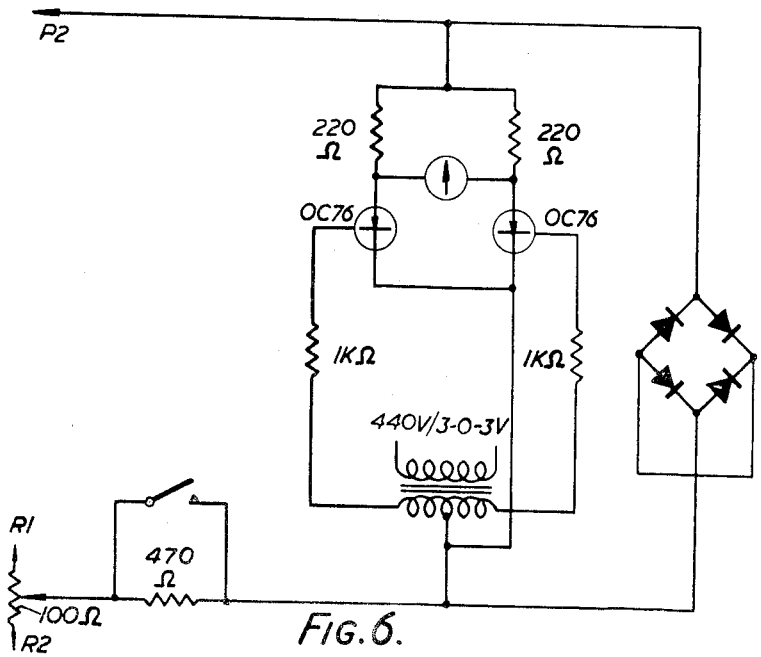
Figure 7:
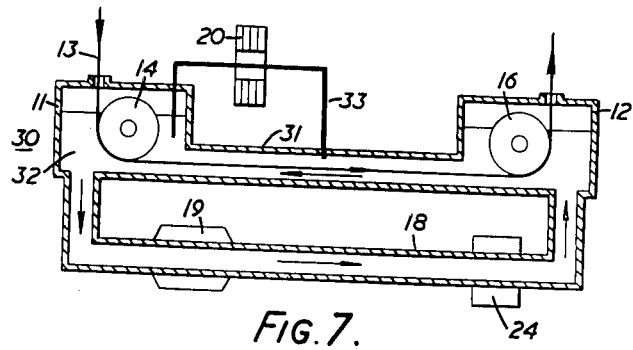
Figure 8:
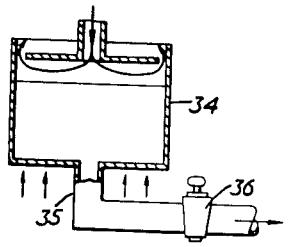
Figure 9:
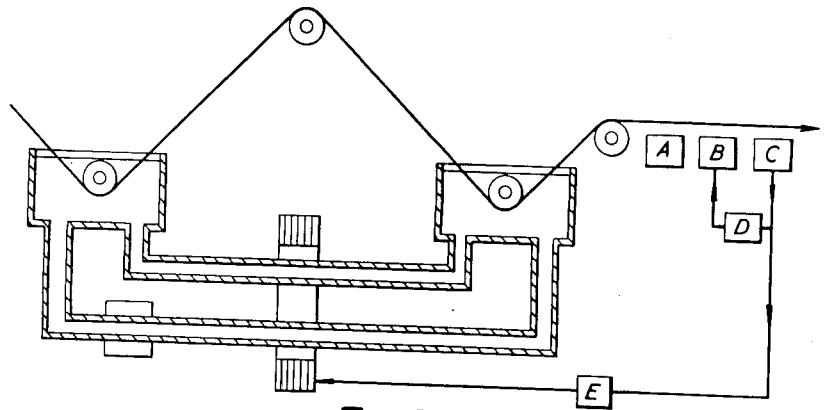

FIGURE 3 comprises curves explanatory of Mark II operation,

FIGURE 4 illustrates one arrangement for controlling the temperature characteristic in Mark II, FIGURE 5 illustrates one arrangement for measuring annealing temperature in Mark I, FIGURE 6 is a detailed circuit arrangement associated with FIGURE 5, FIGURE 7 illustrates diagramamtically one form of strip annealing apparatus with hardness control, FIGURE 8 illustrates diagrammatically a modified Mark II arrangement, and FIGURE 9 illustrates an arrangement for charging apparatus with liquid metal.

Figure 1:
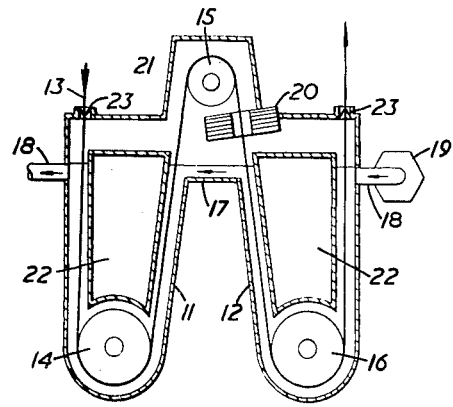
FIGURE 1 illustrates diagrammatically one form of improved Mark I apparatus.

The apparatus of FIGURE 1 comprises two baths 11 and 12 containing an electrically conductive liquid heat transfer medium through which steel strip 13 is passed by means of guide rollers 14 and 16 in the respective baths and a guide roller 15 disposed intermediate and above the two baths.

The baths 11 and 12 are interconnected at their adjacent and farther sides by means of a weir 17 and pipe 18, respectively, whereby the liquid medium can be circulated around a closed path by an electromagnetic pump 19, or some other suitable means.

The strip passing between baths 11 and 12 is heated by a transformer arrangement comprising a core 20 disposed around the strip, which core is associated with a primary winding (not shown) connected to an alternating power supply. The secondary circuit for this heating transformer arrangement is partially formed by the strip to be heated, the circuit being completed by the liquid medium. In practice the liquid medium part of the secondary circuit will be of significantly lower electrical resistance than the remaining part of such circuit formed by the strip 13, so that it is the strip loop between the baths 11 and 12 which is effectively heated.

In the operation of the apparatus of FIGURE 1 for continuous annealing of steel strip 13, the heated strip loop is raised to an annealing temperature of the order of 700° C., for example, and on passing through bath 12 is subsequently quenched by transfer of heat from the strip to the liquid medium. Also, the liquid medium thus heated passes to bath 11 to preheat incoming strip and is itself cooled prior to return to the quench bath 12. In order that the latter cyclic operation should be of high thermal efficiency it is preferred to circulate the liquid medium to flow counter to the motion of the strip through baths 11 and 12, as indicated by arrows.

With the above example of 700° C. for the strip annealing temperature, the temperature of liquid medium passing over the weir 17 may be of the order of 600° C., while that passing through the pipe 18 may be of the order of 200° C., for example.

The apparatus also comprises a hood 21 for maintaining the strip and liquid medium under a protective atmosphere where appropriate. This necessitates the use of strip inlet and outlet sealing arrangements, an improved form for which will be described hereinafter.

As so far described the apparatus of FIGURE 1 corresponds generally to that of the above application relating to Mark I. However, it will be seen that in this instance the baths are of duct form for the passage of strip and liquid medium, the ducts being provided in prefabricated form. This feature is associated with that of the weir 17, the arrangement being such that the liquid medium temperature gradient follows the strip over substantially the whole of their common path. Thus, the strip is preheated by passing through liquid medium in the duct of bath 11 which medium is at continuously increasing temperature substantially up to the point where the strip leaves the liquid to enter its intermediate loop. After heating to annealing temperature, the strip enters the duct of bath 12 to pass through liquid at continuously decreasing temperature for quenching.

Further advantages of the arrangement of FIGURE 1 are that a comparatively low volume of liquid medium, which may well be expensive, is required for operation, and that "high" temperature liquid will tend to rise and is thus pumped over the weir 17 by less power than may otherwise be required.

Regarding forms of strip inlet and outlet sealing arrangements, these may each comprise a pair of silicon-rubber "flaps" on opposite sides of the strip path, the flaps being backed by Phosphor bronze strips acting as leaf springs urging the flaps against the faces of strip 13. The flaps will mutually contact beyond the edges of strip 13 in the event that this is of narrower width than the slit effectively provided by the seal. Also, the edges of the seal slit are formed by silicon rubber bonded to the seal framework and the flap edges, so that in the absence of strip the seal is effectively closed by the spring action.

Seals of the above form are indicated at 23 in FIGURE 1.

Although the above features of duct form baths and strip seals have been described in relation to Mark I they are suitable for application to Mark II apparatus. For completeness then, it is desirable to describe the general form of Mark II apparatus and operation, and FIGURE 2 is included for this purpose.

Figure 2:
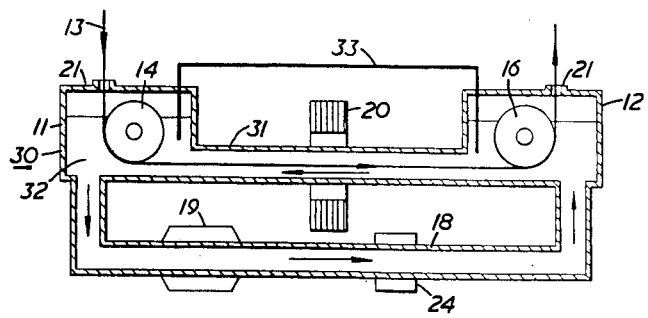
FIGURE 2 illustrates diagrammatically one form of Mark II apparatus.

FIGURE 2 shows a tank having chambers 11 and 12 connected by a duct 31 and a pipe 18. Guide rollers 14 and 16 are disposed in chambers 11 and 12, respectively, whereby steel strip 13 may be passed into chamber 11, through duct 31, and out of chamber 12.

The tank 30 is filled with a liquid heat transfer medium 32 which medium is circulated in the opposite direction through the tank to that of strip 13 by an electromagnetic pump 19, as indicated by arrows.

A heating transformer core 20 is disposed around the duct 31, the liquid medium in which forms part of a single turn secondary winding, the latter being completed by a shorting bar 33 bridging the liquid in chambers 11 and 12. To reduce the induction subsidiary secondary current circulation in pipe 18, a choke 24 is employed. However, such means is unnecessary in the alternative arrangement in which shorting bar 33 is omitted.

In operation the liquid medium in duct 31 forms the major resistance of the secondary winding and is heated to heat the strip 13, in turn. The curves of FIGURE 3 illustrate the overall heat transfer operation along duct 31. Thus, if the strip 13 is considered stationary the temperature of the liquid medium 32 will progressively increase along the duct from right to left as indicated by FIGURE 3(a). Conversely, if the liquid medium 32 is considered to have uniform temperature along the strip path while the strip 13 moves, then the strip temperature will increase progressively from left to right as indicated by FIGURE 3(b).

With both strip and liquid medium moving in counterflow manner as in FIGURE 2, two generally similar and substantially symmetrical curves can be obtained as indicated in FIGURE 3(c). The strip starts, on entry, at a temperature below that of the liquid medium and is progressively heated by heat transfer from the liquid medium to a maximum temperature at about the centre point of its travel. The strip temperature is then progressively reduced by heat transfer to the liquid medium and leaves the medium at a temperature in excess of the liquid medium temperature at the exit point. The same explanation shows that the temperature gradient of the liquid medium through duct 31 is of similar pattern.

It is desirable in the above operation of continuous annealing with the apparatus of FIGURE 2 that the temperature gradient along the strip path through duct 31 should be generally symmetrical, and it will be seen that such temperature characteristic is indicated by the crossover point of the two curves of FIGURE 3(c) being centrally disposed.

This last condition may be indicated and maintained by use of the electrical bridge arrangement of FIGURE 4. In this figure, three electrical probe contacts P1, P2, P3 are respectively inserted into the liquid medium 32 in the chamber 11, the centre of duct 31, and the chamber 12 as indicated. Contacts P1 and P3 are connected to the outer ends of two equal resistors R1 and R2, and contact P2 is connected via a phase sensitive rectifier PR to a common connection between resistors R1 and R2 to form a Wheatstone bridge.

With alternating current operation, the balance point, corresponding to zero output from the rectifier PR, indicates substantial symmetry of the temperature gradient along the strip/liquid medium path, as desired. If the prevailing conditions produce asymmetry, then the electrical resistances formed by the liquid medium between contacts P1, P2 on the one hand and P2, P3 on the other hand accordingly differ since the liquid resistance will change with temperature. The polarity of the rectifier output indicates the "direction" of asymmetry and the amplitude indicates the degree thereof, so that this output signal may be used as an error signal to effect a balance restorative control. Thus, the error signal may be employed to control the electromagnetic pump 19 to vary the circulation rate of liquid medium 32 to maintain the temperature gradient symmetrical.

FIGURE 5 illustrates another form of bridge network for indicating the annealing temperature in Mark I apparatus such as that of FIGURE 1. In FIGURE 5 the network is formed with the middle contact P2 connected to the centre guide roller, or contacting the strip passing over the roller. The effective resistance of the strip will vary with temperature and the bridge used in resistance measuring manner, with a meter M in place of rectifier PR indicates the maximum, or annealing temperature by appropriate calibration of the meter M.

FIGURE 6 illustrates in detail a meter circuit arrangement suitable for connection in place of element M in FIGURE 5. The specific circuit components indicated in FIGURE 6 are intended for use with a bridge network in which R1 and R2 have respective values of 160 and 250 ohms, and the meter circuit is connected by an adjustable tap to a further resistance of 100 ohms value intermediate R1 and R2, as shown.

Considering now the main aspect of the present invention, namely the determination of the temperature characteristic in the heat treatment cycle, there are three principal factors. These factors are strip speed, liquid medium circulation rate, and rate of heat input.

In the Mark I arrangement annealing temperature is determined firstly by the rate of heat input from the transformer and the time for which the strip is subject to such heating, that is to say, strip speed. The annealing temperature will also be determined by some extent by liquid medium circulation rate in as far as if, for a given heat input and strip speed, the preheating effect is increased then clearly annealing temperature will similarly be increased. However, in this instance liquid circulation rate is likely to be a considerably less significant factor. Furthermore, since strip speed may be determined in dependence on other considerations, associated for example with strip mill requirements, it is therefore probably most appropriate to control the annealing temperature by way of the rate of heat input. Even so it will be appreciated that any of the above three factors may be varied to control annealing temperature.

In the Mark II arrangement the same three factors are again relevant and there is the additionally significant consideration of temperature characteristic shape. Returning to the curves of FIGURE 3, it will be appreciated that the slopes of the curves in FIGURES 3(a) and (b) determine the resultant shape of that in FIGURE 3(c), and if 3(c) is to be substantially symmetrical the slopes in 3(a) and 3(b) should be substantially equal. The maximum possible temperature on the other hand is determined by the slope in 3(a) in as far as the liquid receives the primary heating input and the strip is heated by transfer from the liquid. Thus, while as before in the general case all three factors determine the temperature characteristic interdependently so that any one factor may be varied for control purposes, in one arrangement strip speed will be determined in accordance with other requirements such as those of the associated mill, the transformer heat input will be varied to control annealing temperature, and the rate of liquid medium circulation will be varied to control the temperature characteristic shape along duct 31.

In a particular application of the above main aspect of the invention the temperature characteristic, and more particularly the annealing temperature, is controlled in response to detection of the hardness of treated strip whereby hardness itself is controlled. Such a feedback arrangement to control strip hardness via annealing temperature has not been practicable with prior apparatus by virtue of lack of flexibility in adjusting the annealing temperature and the time lag between attainment of annealing temperature and subsequent detection of hardness. That is to say with the previous arrangements employing furnaces and relatively lengthy annealing cycles, by the time the hardness of outgoing strip is detected the strip characteristics in the furnace will most likely have changed as may the furnace conditions. Even without such a time delay making feedback control impracticable, the prior furnaces are not capable of being rapidly adjusted in respect of temperature.

In the present apparatus the treatment cycle is very rapid and operates on a short length along the strip path. Also, the temperature characteristic of the treatment cycle can be quickly adjusted. Thus in a particular arrangement according to the invention means for detecting strip hardness are arranged adjacent the strip exit from the annealing apparatus, and the temperature characteristic is adjusted in response to hardness detection to maintain hardness substantially uniform and the hardness may also be maintained at a substantially predetermined value. Although the final value of strip hardness may be determined by subsequent operations such as overaging and temper rolling, say, these operations will introduce no undue non-uniformity of hardness providing that such operations are relatively consistent as is in fact readily achieved in practice.

The strip hardness detecting means may be of any suitable form capable of being employed in continuous manner with moving strip and is preferably of the form described in co-pending British patent application No. 23,393/63. This preferred form of hardness detecting means comprises a first station for strip magnetisation to saturation and a second, subsequent station for strip magnetisation in the opposite sense, hardness being effectively indicated by a measure of coercive force or remanent magnetism.

Also, in the latter co-pending application there is described a system in which remanent magnetism is detected and represented by an electrical signal which is fed back to control the second station whereby the strip is substantially de-magnetised. The feedback control signal therefore represents variations in hardness and can be additionally fed back to control the temperature characteristic of the heat treatment cycle, via annealing temperature say, whereby hardness is maintained substantially constant. This additional feedback arrangement will accordingly be of null-seeking servo-control form.

FIGURE 7 is a schematic arrangement illustrating this last arrangement for Mark I apparatus. The strip hardness detecting arrangements is indicated at A representing the saturating first station, B representing the effective de-magnetising second station, and C a remanent magnetism detecting station. Effectively null-seeking servo-controls are indicated at D and E, the first being responsive to the output from C to control B for de-magnetisation, and the second being similarly responsive to C to control the heating transformer input for annealing temperature control to maintain hardness substantially uniform. This transformer control may comprise adjustment of a variable tapping arrangement in the transformer primary winding.

In another aspect the present invention provides an improved method and operation for Mark II operation which aspect is illustrated by FIGURE 8 as example. The apparatus of FIGURE 8 is similar in most respects to that of FIGURE 2 and common reference numerals are employed where appropriate as with FIGURES 2 and 1.

The different feature of FIGURE 8 is that the shorting bar 33, instead of bridging chambers 11 and 12, bridges the chamber 11 and an intermediate point of duct 31. The heating transformer core 20 is located around that part of the duct 31 bridged by bar 33 so that during operation liquid medium 32 passing through the bridged portion of duct 31 is successively heated.

As before, strip 13 is passed through the duct 31 from chamber 11 to chamber 12, with the liquid medium 32 circulated through the duct in counterflow manner relative to the strip. The strip is progressively heated to annealing temperature during passage along the bridge duct portion, and the strip is thereafter progressively quenched during subsequent passage through the remainder of duct 31 by heating transfer to the liquid medium which is unheated by transformer action at that part of its cycle through duct 31.

It will be noted that in this modified operation the liquid medium 32 is only heated during passage through that part of the duct 31 in which it is required, in turn, to heat the strip. Liquid medium acting to quench the strip at any time is not actively heated by transformer action at the same time and this feature permits a sharper temperature characteristic to be obtained along the duct 31 than with the operation described above in relation to FIGURES 2 and 3. Operation with a sharper temperature characteristic will, for a given annealing temperature, clearly be more economical.

In this improved operation, it will be appreciated that the relationship of strip speed, transformer heating input, and liquid medium circulation is such as to produce a peak strip temperature for the strip substantially in the region of the end of the bar 33 in duct 31.

Again, reduction of subsidiary heating current in pipe 18 may be effected by use of a choke 24.

A further aspect of the present invention concerns the removal of dross formed from the liquid medium, and this feature is particularly concerned with the use of liquid metal heat transfered medium such as lead or lead/bismuth alloy.

The provision of a protective atmosphere over any liquid metal otherwise open to air is in itself the principal measure for preventing any substantial formation of dross, and it is now found that the protective atmosphere should preferably be maintained with an oxygen content below 0.02% for this purpose.

Unfortunately so-called "cylinder" or "tonnage" nitrogen contains some oxygen, and although this can be removed by passing the nitrogen, with some hydrogen, over palladized asbestos, the resultant mixture of nitrogen, hydrogen and a small amount of water vapour formed by the reaction of the oxygen and some hydrogen will, if fed into the centre section of the Mark I plant, reduce the superficial oxide on the strip by the action of the hydrogen. This "gas fluxing" as it may be called results in wetting of the strip by lead/bismuth and to give rise to liquid metal dragout.

The presently proposed feature of the invention is that this "wetting" condition be avoided by adding a predetermined proportion of water vapour to the atmosphere, this being readily effected by passing the above mixture through water at a prescribed temperature. As far as the liquid metal, be it lead or lead/bismuth alloy, is concerned the presence or absence of either the water vapour or hydrogen makes no difference, the principal criterion in this respect being that free oxygen be excluded. Thus the present proposal is to employ a nitrogen-hydrogen-water vapour protective atmosphere which is reducing to the liquid metal and at the same time slightly oxidising to the strip.

The appropriate proportions of hydrogen and water vapour necessary to prevent reduction of the superficial oxide, at a particular annealing temperature, may be determined by reference to the publication "Controlled Atmospheres in the Heat Treatment of Metals" by I. Jenkins.

Another feature of this aspect of the invention concerns the initial charging of the heat treatment apparatus with liquid metal which is substantially dross free. FIGURE 9 illustrates one form of apparatus for such charging whereby the liquid metal is supplied from a substantially closed container 34 by bottom pouring through a pipe 35 which includes a control tap 36. The liquid medium in container 34 is heated to a temperature, of the order of 800° C., at which dross is reduced; and in addition a gas, such as coal gas, which is reducing to dross formed from the liquid metal, is supplied through the upper container surface to fill any gap between such surface and the liquid metal. The upper container surface is provided with peripheral outlets whereby the reducing gas may leave the container. Where appropriate, such as in the case of coal gas, the reducing gas may be burned at the peripheral outlets and this is advantageous in assisting heating of the liquid metal in the region where any dross formed will accumulate, namely the upper liquid surface.

The container 34 may conveniently be in the form of a non-sealed piston-and-cylinder assembly having a hollow piston rod for entry of reducing gas, as shown.

In practice, any dross which is not reduced may be readily retained in the container 34 by closure of the control tap 36 at the appropriate liquid level in the container.

I claim:
1. A heat treatment process for moving elongate ferrous material which comprises passing the material through at least one liquid heat transfer medium stage, successively heating the material by induction heating between its initial entry into and final exit from the liquid medium, successively detecting the hardness of the material following its exit from said liquid medium, and controlling the temperature characteristic to which the material is subjected in response to the detected hardness to maintain the hardness of the material substantially uniform.

2. Heat treatment apparatus for moving elongate ferrous material comprising container means for liquid heat transfer medium, means for passing the material through at least one portion of said container means, induction heating means for successively heating the material between its initial entry into and final exit from the liquid medium in said container means, means for successively detecting the hardness of the material following its exit from the liquid medium in said container means, and means connected for response to the hardness detecting means for controlling the temperature characteristic to which the material is subjected.

3. Continuous annealing apparatus for moving elongate ferrous material comprising a preheat liquid heat transfer medium bath, a quench liquid heat transfer medium bath, means for circulating liquid heat transfer medium between the preheat bath and quench bath in a closed liquid circuit, means for passing the material successively through said preheat bath and then said quench bath, induction heating means for heating the material to annealing temperature as it passes between said preheat and quench baths, means subsequent to said quench bath for detecting variations in the hardness of the material, and means responsive to the hardness detecting means for controlling the annealing temperature to maintain the hardness of the material substantially constant.

4. Apparatus according to claim 3 wherein the liquid medium circulation means is arranged to circulate the liquid medium through said preheat and quench baths in counterflow to the passage of the material therethrough.

5. Apparatus according to claim 3 wherein the induction heating means comprises a heating transformer arrangement the secondary winding of which is formed by the material and liquid medium passing between said preheat and quench baths.

6. Apparatus according to claim 3 wherein the annealing temperature control means is arranged to control the rate of heating of said induction heating means.

7. A process for operating the apparatus according to claim 3 in which process the liquid medium is liquid metal, and the material passing between said baths and the liquid medium therein is maintained under a controlled protective atmosphere, the protective atmosphere being controlled to be reducing to the liquid metal and slightly oxidising to the ferrous material.

8. A process according to claim 7 wherein said atmosphere comprises a nitrogen-hydrogen-water vapour mixture.

9. Continuous annealing apparatus for moving elongate ferrous material comprising a closed circuit contained for liquid heat transfer medium, means for circulating liquid medium through said container around the closed circuit provided thereby, transformer heating means for heating to annealing temperature at least part of the liquid medium passing around said closed circuit which heating means employs the liquid medium as secondary winding, means for passing the material through said container at least through the heated liquid medium in counterflow to such liquid medium, means for detecting variations in the hardness of the material leaving said container, and means for controlling the temperature characteristic of the heat liquid medium in response to detected variations of material hardness to maintain such hardness substantially uniform.

10. Apparatus according to claim 9 wherein the temperature characteristic controlling means comprises means for controlling the rate of heating the liquid medium to control the annealing temperature, and means for controlling the rate of liquid medium circulation to control the shape of the liquid medium temperature characteristic.

References Cited by the Examiner

UNITED STATES PATENTS

| 1,319,085 | 10/1919 | Jacobson | 148—4 |
| 1,544,506 | 6/1925 | Tytus | 266—3 X |
| 1,676,685 | 7/1928 | Cammen | 266—3 X |
| 2,755,327 | 7/1956 | Tama | 22—79 X |

DAVID L. RECK, *Primary Examiner.*

C. N. LOVELL, *Assistant Examiner.*